United States Patent [19]

Schnackel et al.

[11] Patent Number: 4,642,440
[45] Date of Patent: Feb. 10, 1987

[54] SEMI-TRANSFERRED ARC IN A LIQUID STABILIZED PLASMA GENERATOR AND METHOD FOR UTILIZING THE SAME

[76] Inventors: Jay F. Schnackel, 47156 Beechcrest Dr., Plymouth, Mich. 48170; Karel Zverina, Biddle House Apt. 8D, 2502 Biddle Blvd., Wyandotte, Mich. 48192

[21] Appl. No.: 670,636

[22] Filed: Nov. 13, 1984

[51] Int. Cl.⁴ .................................................. B23K 9/00
[52] U.S. Cl. ........................... 219/121 PP; 219/76.16; 219/121 PL; 219/121 PT; 427/34
[58] Field of Search .................. 219/121 PY, 121 PM, 219/121 PP, 121 PR, 121 PT, 121 PU, 76.16, 75, 121 PL; 427/34

[56] References Cited

U.S. PATENT DOCUMENTS

| Re. 28,570 | 10/1975 | Tyiko | 219/121 P |
|---|---|---|---|
| 2,847,555 | 8/1958 | Yenni | 219/76 |
| 2,858,411 | 10/1958 | Gage | 219/75 |
| 2,862,099 | 11/1958 | Gage | 219/74 |
| 2,982,845 | 5/1961 | Yenni et al. | 219/76 |
| 3,016,447 | 1/1962 | Gage et al. | 219/76 |
| 3,153,133 | 10/1964 | Ducati | 219/121 P |
| 3,179,783 | 4/1965 | Johnson | 219/76 |
| 3,205,338 | 9/1965 | Sunnen | 219/121 P |
| 3,246,115 | 4/1966 | Johnson | 219/121 P |
| 3,248,513 | 4/1966 | Sunnen | 219/76 |
| 3,250,893 | 5/1966 | Nestor | 219/121 P |
| 3,311,735 | 3/1967 | Winzeler et al. | 219/121 P |
| 3,562,486 | 2/1971 | Hatch et al. | 219/121 P |
| 3,745,321 | 7/1973 | Shapiro et al. | 219/121 P |
| 3,790,742 | 2/1974 | Auer | 219/121 P |
| 3,839,618 | 10/1974 | Muehlberger | 219/121 PL |
| 3,962,486 | 6/1976 | Gerek et al. | 219/121 PL |
| 3,988,566 | 10/1976 | Vogts et al. | 219/121 P |
| 4,017,707 | 4/1977 | Brown et al. | 219/121 P |
| 4,055,741 | 10/1977 | Bykhovsky et al. | 219/121 P |
| 4,058,698 | 11/1977 | Bykhovsky et al. | 219/121 P |
| 4,125,754 | 11/1978 | Wasserman et al. | 219/121 P |
| 4,156,125 | 5/1979 | Brown | 219/124.02 |
| 4,217,470 | 8/1980 | Kirner | 219/121 P |
| 4,280,041 | 7/1981 | Kiessling et al. | 219/121 P |
| 4,311,897 | 1/1982 | Yerushalmy | 219/121 PP |
| 4,330,700 | 5/1982 | Jagieniak et al. | 219/121 P |
| 4,338,509 | 7/1982 | Bartuska et al. | 219/121 PP |
| 4,421,970 | 12/1983 | Couch, Jr. | 219/121 PP |
| 4,439,657 | 3/1984 | Shimanovich et al. | 219/121 P |
| 4,484,959 | 11/1984 | Boucher et al. | 219/121 P |

FOREIGN PATENT DOCUMENTS 0014613 8/1980 European Pat. Off.
206572 12/1982 Japan.

OTHER PUBLICATIONS

"The Potentialities of Arc-Plasma Techniques in Marine Applications" Production Engineer, vol. 51, No. 20, Oct. 1972, pp. 337-334, Bidmead.
"Studies on Plasma Arc Welding" Hasui, Transactions of National Research Institute for Metals vol. 10, No. 6, 1968.
"Plasma and its Uses" Gilbano, May 1967.
"Utilization of Plasmas in the Area of Spray Coating" Moulliet, 1970.

Primary Examiner—M. H. Paschall
Attorney, Agent, or Firm—Jeffers, Irish & Hoffman

[57] ABSTRACT

A plasma generator arrangement for applying material to an electrical conductive substrate and method for utilizing the same. The generator arrangement comprises a generator for creating and extending towards the substrate a plasma stream containing the material. The plasma generator arrangement further including structure for selectively controlling the electrical potential of the substrate relative to the generator anode so as to vary with time the extension of the plasma stream past the generator.

7 Claims, 8 Drawing Figures

SEMI-TRANSFERRED ARC IN A LIQUID STABILIZED PLASMA GENERATOR AND METHOD FOR UTILIZING THE SAME

BACKGROUND OF THE INVENTION

The invention relates to a fluid stabilized plasma generator arrangement utilized to apply coatings to substrates. More specifically, the invention relates to a semi-transferred arc stabilized plasma generator utilized to apply coatings to substrates and method for utilizing said plasma generator.

Liquid stabilized plasma generators have been utilized to apply coatings to substrates. U.S. Pat. No. 4,338,509 issued July 6, 1982 for a "Process of and Apparatus for Producing a Homogeneous Radially Confined Plasma Stream" shows a such a liquid stabilized plasma generator. In an apparatus such as that illustrated in U.S. Pat. No. 4,338,509, the electric arc is struck between the tip of the rod cathode and the edge of the rotating anode. The arc does not extend past the anode toward the substrate. Stabilizing liquid, such as water, entering a stabilizing chamber in the plasma generator encounters the arc and disassociates into its plasma state. The plasma then passes from the chamber as a plasma stream through a nozzle orifice. Coating material in particulate form is fed into the plasma stream downstream of the anode. The coating material is transformed into its liquid, gaseous and/or plasma states depending upon the energy of the stream and the particular coating material.

The plasma stream extends past the nozzle a certain distance at which it may be considered to terminate. The charged particles in the plasma stream past the anode recombine so as to release thermal energy. This release of thermal energy upon recombination is what provides the plasma stream with its very high temperature. Practically speaking, the charged particles have all recombined into certain compounds past the termination point or end of the plasma stream. These compounds are then carried on to the substrate so as to apply a coating, which is comprised of these compounds, to the substrate.

In an arrangement such as that illustrated in U.S. Pat. No. 4,338,509, if the surface of the substrate is past (or downstream of) the termination of the plasma stream, there is essentially no concentration of charged particles at the surface of the substrate. In this condition, the surface is not "active" or prone to chemically react with the coating compounds which, prior to impingement on the surface, have already recombined. The result is that a physical-type bond is formed between the substrate and the coating.

In some coating applications, a coating which is physically bonded to the substrate is satisfactory. However, in many coating applications, it would be desirable to provide a coating that is chemically bonded to the substrate.

As is apparent from the above discussion, the temperature of the substrate and of the coating material as it is deposited on the substrate are two parameters that must be considered if one desires to form a chemical bond between the coating and the substrate. Furthermore, if some of the coating material is ionized at the surface of the substrate, chemical bonding is more likely. The tendency of the substrate surface material to chemically react with the coating material increases as the temperature of the substrate and coating material increases. It would thus be desirable to provide a semi-transferred liquid stabilized plasma generator wherein the surface of the substrate could be raised to a temperature that would enhance its ability or tendency to chemically react with the coating material.

Another parameter which must be considered is the velocity at which the coating material impinges upon the surface of the substrate. The plasma generator illustrated in U.S. Pat. No. 4,338,509 operates so that the coating material impinges the substrate at a sufficient velocity to form a bond between the substrate and the coating. However, this bond is a physical-type of bond. If one desires to form a chemical-type bond between the substrate and the coating, it would be desirable if the velocity of the coating material impinging on the surface of the substrate would be higher than that velocity capable of being produced by the operation of the non-transferred arc liquid stabilized plasma generator illustrated in U.S. Pat. No. 4,338,509.

In some coating applications, it is desirable to form certain compounds such as, for example, oxides, carbides and nitrides as compounds in the coating. However, the direct feeding of particulate carbide material or the like into the plasma stream may create difficulties with the optimum application of a coating. Thus, in some of the above applications it would be desirable if the stabilizing liquid would be of a chemical composition to include the necessary compound-forming elements, such as oxygen, carbon and nitrogen atoms required to form the oxides, carbides and nitrides. However, if the temperature of the substrate surface is not sufficiently high and the velocity of the plasma stream is not sufficiently high, then there is not the optimum formation of compounds such as the oxides, carbides or nitrides. It would thus be desirable to provide a semi-transferred arc liquid stabilized plasma generator arrangement wherein operating parameters are provided for the optimum formation of compounds in the coatings, for example, oxides, nitrides or carbides, wherein at least some of the compound forming elements such as atoms, free electrons and ions are constituents of the stabilizing liquid.

In some coating applications, it is desirable that certain compounds be formed in the coating wherein the compound forming elements are contained in the anode of the plasma generator arrangement. In other words, the anode may be comprised of materials such as iron, copper, aluminum or graphite wherein it is desired that one of those elements be a constituent of a compound in the coating. It would thus be desirable to provide a semi-transferred arc liquid stabilized plasma generator arrangement wherein operating parameters are provided for the optimum formation of compounds in the coating wherein the compound forming elements, such as atoms, free electrons and ions, are constituents of the anode.

In certain applications, it would be desirable to form a coating on the substrate that includes non-stoichiometric compounds or compounds that are chemical intermediates in the chemical reactions that would normally occur at a generally constant temperature. By varying the temperature of chemical reaction, they can sometimes be controlled to produce chemical intermediates. Thus, it would be desirable to provide a semi-transferred arc liquid stabilized plasma generator that can control or vary the temperature at the substrate surface.

In certain coating applications, it would be desirable if the surface of the substrate was very prone to chemically react with the coating material. This could be enhanced if the surface was depleted of electrons so as to leave charged ions at the surface. These ions would be very prone to react with the coating material. Thus, it would be desirable to provide a semi-transferred arc liquid stabilized plasma generator that is arranged so as to cause an electron migration from the surface of the substrate.

A deficiency in the prior art is the lack of a process and apparatus for varying the reactivity of the plasma stream with the substrate and with the coating material during the time that the coating material is being deposited on the substrate.

SUMMARY OF THE INVENTION

The method and apparatus according to the present invention, in one form thereof, provides for a control of the length of the plasma stream, that is, that portion of the stream wherein ions and other charged particles are present, during depositing of the coating. This is accomplished by connecting the substrate, which must be conductive, to a voltage source which typically is more positive than the voltage at the anode. If the voltage differential between the anode and substrate is sufficiently high, the plasma stream will be extended all the way to the substrate such that the charge density of particles comprising electrons, ions from the stabilizing fluid and ionized molecules or atoms of the coating material, will be present on the substrate during deposition of the coating. This results in making the substrate more reactive thereby causing chemical bonding between the coating and the substrate.

By providing such chemical bonding and the chemical interaction of the coating material with the plasma stream, non-stoichiometric molecules will be formed, and by controlling the length of the plasma stream so that it can be retracted away from the substrate, typical stoichiometric compounds can also be formed. This gives the ability to control the composition and layer structure of the coating applied to the substrate.

Furthermore, it is possible to reverse the polarity of the substrate by connecting the substrate to the negative voltage terminal of a source. This, in effect, forms an arc between the substrate and the anode and makes the surface of the substrate extremely reactive and also provides turbulence within the plasma stream resulting in an increase in the charge density at a point intermediate the anode and substrate.

It is the ability to control the "transfer" of the arc during coating which enables such a variety of coating conditions to be achieved. This control of the plasma stream can be implemented by opening and closing the circuit between the substrate and positive voltage source, by adjusting the voltage applied to the substrate or by reversing the polarity of the substrate.

The invention, in one form thereof, relates to a plasma generator arrangement for applying material to an electrically conductive substrate having a generator for creating and extending towards the substrate a plasma stream containing the coating material and means for selectively controlling the electrical potential of the substrate during coating so as to lengthen or shorten the extension of the plasma stream past the generator.

The invention also relates, in another form thereof, to a method of controlling the charge density gradient of a plasma stream by varying the potential of the substrate during generation of the plasma stream.

It is an object of the invention to provide a semi-transferred arc liquid stabilized plasma generator arrangement utilized to apply coatings to substrates.

It is another object of the invention to provide a semi-transferred arc liquid stabilized plasma generator arrangement and method for utilizing the same wherein the plasma stream extends relative to the substrate so that the temperature at the surface of the substrate is sufficiently high to partially melt the substrate material at the surface so as to enhance the ability or tendency of the substrate to chemically react with the coating material to form a chemical-type bond between the substrate and the coating.

It is another object of the invention to provide a semi-transferred arc liquid stabilized plasma generator arrangement and method for utilizing the same wherein the velocity of the coating material impinging upon the substrate is sufficiently high to enhance the ability or tendency of the substrate to chemically react with the coating material to form a chemical-type bond between the substrate and the coating.

It is another object of the invention to provide a semi-transferred arc liquid stabilized plasma generator arrangement and method for utilizing the same wherein desired compounds are formed on the surface of the substrate from compound forming elements contained in the stabilizing liquid and/or the anode.

It is another object of the invention to provide a semi-transferred arc liquid stabilized plasma generator arrangement and method for utilizing the same that can control or vary the temperature at the substrate surface during depositing of the coating.

Finally, it is an object of the invention to provide a semi-transferred arc liquid stabilized plasma generator arrangement and method for utilizing the same wherein there is caused an electron migration from the surface of the substrate so as to make the surface very prone to chemically react with the coating material.

BRIEF DESCRIPTION OF THE DRAWINGS

The above-mentioned and other features and objects of this invention and the manner of attaining them will become more apparent and the invention itself will be best understood by reference to the following description of specific embodiments of the invention taken in conjunction with the accompanying drawings.

DETAILED DESCRIPTION OF SPECIFIC EMBODIMENTS

Figure 1:
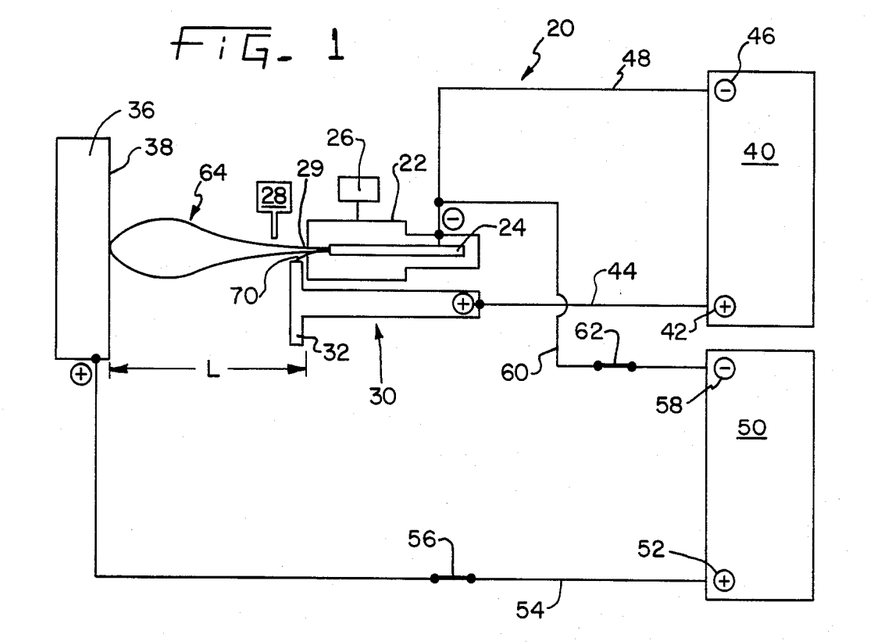
FIG. 1 is a schematic view illustrating a specific embodiment of the invention.

Referring to FIG. 1, there is illustrated a plasma generator arrangement generally designated as 20. Plasma generator arrangement 20 includes a plasma generator having an elongate generator body 22. A rod cathode 24 is contained within generator body 22.

A source of stabilizing liquid 26, such as water, alcohol or picoline, is in operative communication with generator body 22. Plasma generator arrangement 20 further includes a rotating anode assembly 30 having a rotatable anode 32. A source of coating material 28 is positioned downstream of the anode 32 of the plasma generator. Coating material can thus be fed into the plasma stream. Typically, the coating material is in particulate form for feeding into the plasma stream.

A substrate 36 is positioned away from generator body 22. Substrate 36 is positioned so that its surface 38 is a longitudinal distance "L" away from nozzle 29.

A first DC power source 40 includes a positive terminal 42. Terminal 42 is connected by wire 44 to anode assembly 30. Direct current electrical power source 40 further includes a negative terminal 46 which is connected by wire 48 to rod cathode 24.

The plasma generator arrangement further includes a second direct current electrical power source 50. Second power source 50 has a positive terminal 52 which is connected by a wire 54 through switch 56 to substrate 36. Second electrical power source 50 further includes a negative terminal 58 connected by wire 60 through switch 62 to rod cathode 24. As will become apparent hereinafter, several various electrical connections other than the above-described connection may be used with the semi-transferred arc liquid stabilized plasma generator of the invention. In viewing FIG. 1, the plasma stream is generally designated as 64.

U.S. Pat. No. 4,338,509 issued on July 6, 1982 for a "Process of and Apparatus for Producing a Homogeneous Radially Confined Plasma Stream" describes therein the general operation of a non-transferred arc liquid stabilized plasma generator. In regard to the general operation of a plasma generator, applicants hereby incorporate by reference herein the disclosure of said U.S. Pat. No. 4,338,509.

A general description of the operation of the semi-transferred arc liquid stabilized plasma generator arrangement of the invention will now be set forth with reference to FIG. 1. It should be mentioned that the voltage of terminal 52 of the electrical voltage of power source 50 is greater than the voltage of terminal 42 of electrical source 40. For example, second source 50 may have a voltage of 800 volts as compared to first power source 40 which may have a voltage of 500 V. It should also be mentioned that the second or additional electrical power source could, for example, be able to regulate the output voltage in 50 volt increments between 300 V to 800 V. The power source could also, for example, be able to adjust the amperage over a range of 50 A to 300 A. By providing the ability to vary the electrical parameters of the plasma generator arrangement, it should be understood that the concentration of charged particles at the surface of the substrate, and hence, the temperature of the substrate surface, can be selectively controlled. The ability to control the concentration of charged particles at the surface of the substrate provides an advantageous feature to applicants' invention.

Figure 6:
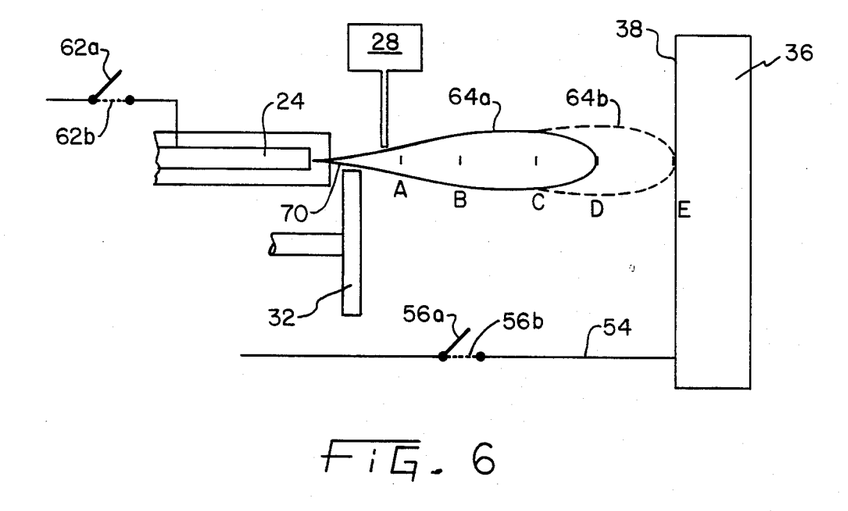
FIG. 6 is a schematic view of a portion of the specific embodiment of FIG. 1 illustrating the travel of the plasma stream when a positive potential exists and does not exist at the substrate.

Referring to FIG. 6, switches 56 and 62 of FIG. 1 are illustrated (in FIG. 6) in either an open position or a closed position. When switches 56 and 62 are open, the liquid stabilized plasma generator arrangement operates as a non-transferred arc plasma generator. The operation of the plasma generator in a non-transferred condition will now be set forth.

When DC electric power is applied to the cathode 24 and anode 32, an electric arc 70 is struck therebetween. A stabilizing liquid is fed into the chamber of generator body 22 so that the electric arc contacts the liquid vortex of stabilizing liquid. As can be appreciated, a high level of energy is supplied to the liquid so as to disassociate it into its plasma state comprising ions and free electrons. The degree of disassociation is dependent upon the amount of energy of the electric arc.

The plasma is emitted from the generator orifice 29 under high pressure as a plasma stream. As illustrated in FIG. 6, this plasma stream 64a, the postscript "a" designating that switches 56 and 62 are open, extends towards substrate 36.

After the plasma stream passes out of the electric arc, no more energy is supplied to the plasma stream. The ions in the plasma stream begin to recombine once they have extended past the electric arc. Upon the recombination of the ions, thermal energy is created which is measured as the temperature of the plasma stream. The concentration of charged particles in the plasma stream decreases as one moves toward the substrate. The temperature of the plasma stream is higher in areas of higher concentration of charged particles. Consequently, in viewing FIG. 6, the temperature of the plasma stream at point A ($T_a$) is greater than the temperature of the plasma stream at point B ($T_b$). It can thus be seen that the following relationships exists between the temperatures found at points A, B, C and D of plasma stream 64a:

$$T_a > T_b > T_c > T_d$$

It can also be appreciated that the temperature at point D, $T_d$, is greater than the temperature at point E, $T_e$, which is the temperature at the surface of the substrate.

In the non-transferred arc conditioned, the plasma generator arrangement illustrated in FIGS. 1 and 6 generates a plasma stream that does not have sufficient length to reach the surface of the substrate. Virtually all of the ions and free electrons in the plasma stream have recombined by the time they impinge upon the surface of substrate 36. Further, the temperature of surface 38 of substrate 36 is not sufficiently high so as to partially melt surface 38. In this situation, it can be appreciated that while a coating material is applied to the substrate there exists a physical-type bond between the coating material and substrate.

As can be appreciated, with switches 56 and 62 being closed (in positions 56b and 62b) a positive voltage is placed on substrate 36. In view of the presence of a positive voltage at the substrate, the plasma stream lengthens so as to extend closer to the surface of the substrate. In the specific embodiment of FIG. 1 and FIG. 6, the plasma stream 64b illustrated as dashed lines extends so that the termination point of the plasma stream is at the surface of the substrate.

It should be appreciated that the length of the plasma stream can be varied from that position illustrated in FIGS. 1 and 6. For instance, the presence of a greater positive voltage at the substrate thereon in FIG. 1 will result in the lengthening of the plasma stream so that the concentration of charged particles at the surface will be greater than that shown in FIG. 1. On the other hand, the presence of a positive voltage at the substrate which is greater than zero but less than that in FIG. 1 will result in the lengthening of the plasma stream towards the substrate. However, the termination point of the plasma stream will not extend all the way to the surface of the substrate.

As a consequence of the plasma stream being at or near the surface of the substrate, there exists an increased concentration of electrically charged particles at or near the surface of the substrate. The portion of the surface of the substrate close to the charged particles may even be heated up to a temperature whereby it partially melts. As can be understood, a surface that is partially molten is more prone to chemically react with the impinging constituents in the plasma stream than a surface that is in a solid state of matter.

As can be understood, charged particles, such as ions and electrons, are more prone to chemically react than uncharged compounds. It therefore follows that extending the length of the plasma stream to the surface of the substrate would increase the tendency for chemical reactions to occur. With a non-transferred arc, the charged particles in the plasma stream recombine into compounds prior to impinging on the surface of the substrate. However, by extending the length of the plasma stream there is an increased concentration of charged particles at the melted surface, which leads to the formation of chemical bonds between the constituents of the plasma stream, coating material and the substrate.

As can be appreciated, the velocity of the coating material when it impinges upon the surface of the substrate is quite higher as compared to earlier devices such as the plasma generator illustrated in U.S. Pat. No. 4,338,509.

In the semi-transferred plasma generator of FIGS. 1 and 6, when the substrate has a sufficient positive charge thereon, there is created operating conditions which result in the formation of a chemical bond between the substrate and the coating material. In other words, the result of the coating operation is the formation of a bond layer of a new composition having elements in the substrate as constituents as well as elements in the coating material as constituents. In some situations, the bond layer is intermediate of the substrate and coating layer. Further, as will become apparent hereinafter, elements contained in the stabilizing liquid as well as in the rotating anode can also comprise some of the constituents of compounds in the bond layer or the coating layer.

The invention provides a method and apparatus whereby the "arc" can be alternately transferred and non-transferred during the time that the plasma stream is being generated and coating material is being deposited on the substrate. In other words, the length of the plasma stream can be adjusted relative to the substrate whereby, for a certain portion of the coating process, the plasma stream can be in contact with the substrate, and then subsequently shortened by either disconnecting the substrate from the voltage source or changing the voltage source so that there is less voltage differential between rotating anode 32 and substrate 36. As the length of the plasma stream changes, so does its temperature gradient due to the distribution of charge density throughout the plasma stream. It is this ability to change and modify the length of the plasma stream by altering the voltage relationship between the rotating anode and substrate that permits the controlled formation of coating constituents and coating layer structure that was not possible with the prior art.

THEORETICAL CALCULATION

In order to illustrate the increase of temperature at the surface of the substrate, a theoretical calculation can be made should be helpful. The theoretical calculation set out below utilizes water ($H_2O$) as the stabilizing liquid. Further, the voltage provided is approximately 360 volts DC and the current is approximately 450 amperes.

In making these theoretical calculation, eight generally equi-spaced cross sections (identified from "0" to "7") are taken beginning at the nozzle 29 of the plasma generator 22 (the cross-section identified as "0") and continuing to the surface 38 of the substrate 36 (the cross-section identified as "7"). The cross sections are spaced approximately 10 millimeters apart and the length of the arc varies from 65 millimeters to 80 millimeters. These calculations are based on known equations. These theoretical calculations are set out below in Table I.

TABLE I

| | | | Calculated Temperature, Particle Concentration and Electrical Conductivity of the Plasma Stream at Various Locations Away From the Nozzle. | | | | | | | | |
|---|---|---|---|---|---|---|---|---|---|---|---|
| Cross Section | Distance From Nozzle | Calculated Temperature (°K.) | Calculated Particle Concentration ($n \times 10^{10}[cm^{-3}]$) | | | | | | E[v/cm] | Radius of the Conductive Plasma (R) | Calculated Electrical Conductivity $\delta\ [\Omega^{-1}]$ |
| | | | $\eta_o$ | $\eta_n$ | $\eta_{o+}$ | $\eta_{n+}$ | $\eta_{o++}$ | $\eta_e$ | | | |
| 0 | 0 | 28,000 | 0 | 0 | 3.6 | 7.6 | .8 | 12.8 | 56.25 | 2.5 mm | 184 |
| 1 | 10 mm | 24,500 | 0 | 0 | 4.9 | 9.1 | 0 | 14.0 | | 3.5 mm | 180 |
| 2 | 20 mm | 23,700 | 0 | 0 | 5.3 | 9.5 | 0 | 14.8 | | 5 mm | 176 |
| 3 | 30 mm | 22,500 | 0 | 0 | 5.5 | 9.8 | 0 | 15.3 | | 7 mm | 165 |
| 4 | 40 mm | 18,000 | 0 | 0 | 6.3 | 12.2 | 0 | 18.5 | | 8 mm | 133 |
| 5 | 50 mm | 14,000 | 0 | 1.2 | 3.0 | 9.2 | 0 | 12.2 | | 9 mm | 97 |
| 6 | 60 mm | 12,500 | 9.2 | 16.0 | 2.2 | 5.6 | 0 | 7.8 | | 9 mm | 62 |

TABLE I-continued

| | | | Calculated Temperature, Particle Concentration and Electrical Conductivity of the Plasma Stream at Various Locations Away From the Nozzle. | | | | | | | | | |
|---|---|---|---|---|---|---|---|---|---|---|---|---|
| Cross Section | Distance From Nozzle | Calculated Temperature (°K.) | Calculated Particle Concentration (n × $10^{10}$[cm$^{-3}$]) | | | | | | E[v/cm] | Radius of the Conductive Plasma (R) | Calculated Electrical Conductivity $\delta$ [$\Omega^{-1}$] |
| | | | $\eta_o$ | $\eta_n$ | $\eta_{o+}$ | $\eta_{n+}$ | $\eta_{o++}$ | $\eta_e$ | | | |
| 7 | 70 mm | 10,000 | 22.0 | 45.0 | 0 | 1.6 | 0 | 1.6 | | 4 mm | 34 |

As can be seen by the above theoretical calculations, the surface of the substrate and the plasma stream are at a relative high temperature so as to cause the substrate material at the surface to be much more reactive. Although specific proposed examples will be set forth hereinafter, applicants now set out below typical types of stabilizing liquids, substrate materials, coating materials and electrodes that could be used with the plasma generator arrangement of the invention.

Typical stabilizing liquids could be water ($H_2O$), ethyl alcohol ($CH_3CH_2OH$), 2-picoline ($CH_3C_5H_4N$) and m-toluidine ($CH_3C_6H_4NH_2$). Typical metallic substrates could be iron (Fe), copper (Cu) or aluminum (Al). A typical nonmetallic substrate could be graphite (C). A typical metallic coating material could be a mixture of nickel (Ni) and chromium (Cr), a mixture of nickel (Ni), silicone (Si) and boron (B) and a mixture of nickel (Ni), chromium (Cr) and boron (B). Typical nonmetallic coating materials could be $ZrO_2$ stabilized with $Y_2O_3$, or $ZrSiO_4$, or $Al_2O_3$. A typical kind of cathode material would be graphite (C). A typical kind of anode material would be iron (Fe) or titanium (Ti).

Figure 2:
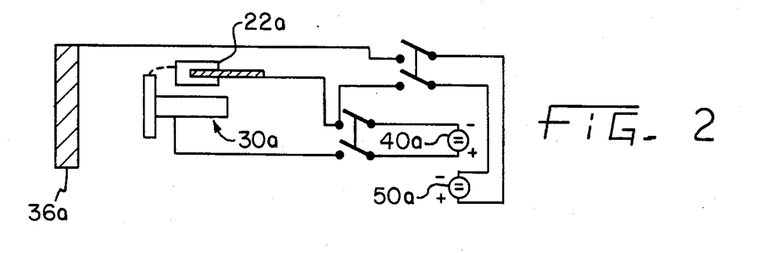
FIG. 2 is a schematic view illustrating a specific embodiment of the invention with electrical connections along the lines of FIG. 1 wherein the positive pole of the additional electrical source is connected to the substrate and a negative pole of the additional electric source is connected to the rod cathode.
Figure 3:
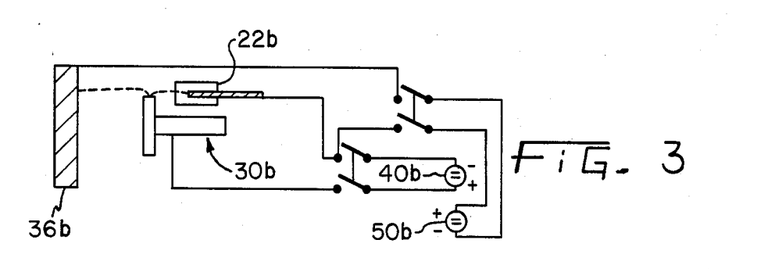
FIG. 3 is a schematic view of another specific embodiment of the invention having electrical connections wherein the positive pole of the additional electrical source is connected to the cathode and the negative pole of the additional electrical source is connected to the substrate.

Referring now to FIGS. 2, 3, 4 and 5, there are a number of specific embodiments illustrating various electrical connections with the independent or second direct current electrical source. FIGS. 2 and 3 illustrate the independent direct current electrical sources (50a and 50b, respectively) being connected between the cathode 30a of the plasma generator and the substrate 36a. More specifically, in FIG. 2 the positive pole of the independent electrical source 50a is connected to the substrate 36a, and the negative pole of the independent electrical source 50a is connected to the rod cathode in generator 22a. This electrical arrangement is along the lines of the electrical arrangement illustrated in FIGS. 1 and 6. In specific reference to FIG. 3, the positive pole of the independent electrical source 50b is connected to the rod cathode 30b in generator 22b and the negative pole of the independent electrical source 50b is connected to the substrate 36b.

Figure 4:
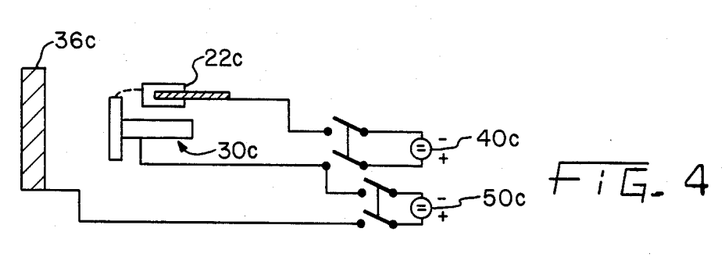
FIG. 4 is a schematic view of another specific embodiment of the invention having electrical connections wherein the positive pole of the additional electrical source is connected to the substrate and the negative pole of the additional electrical source is connected to the anode.
Figure 5:
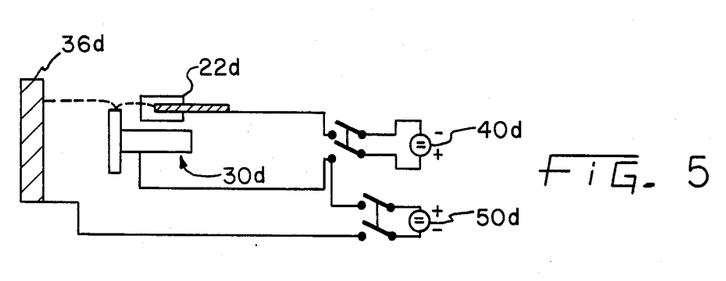
FIG. 5 is a schematic view of another specific embodiment of the invention having electrical connections wherein the positive pole of the additional electrical source is connected to the anode and the negative pole of the additional electrical source is connected to the substrate.

FIGS. 4 and 5 illustrate specific embodiments illustrating various electrical connections wherein the independent or second direct current electrical sources 50c and 50d, respectively are connected between the anodes 30c or 30d of the plasma generator and the substrate 36c or 36d. More particularly, FIG. 4 illustrates the positive pole of the independent electrical source 50c being connected to the substrate 36c and the negative pole of the independent electrical source 50c being connected to the anode 30c. FIG. 5 illustrates the positive pole of the independent electrical source 50d being connected to the anode 30d, and the negative pole of the independent electrical source 50d being connected to the substrate 36d. This electrical arrangement is along the lines of the electrical arrangement illustrated in FIG. 7. The operation of the plasma generator in this type of arrangement will now be described in more detail below.

It should be mentioned that FIGS. 2 through 5 are intended to illustrate the electrical connections. FIGS. 2-5 are not intended to include every element of structure such as that found in the mechanical schematic illustration of FIG. 1.

As can be appreciated, this occurrence enhances the ability of the arrangement to elevate the temperature of the substrate surface. These arrangements are illustrated in FIGS. 2 and 4.

Figure 7:
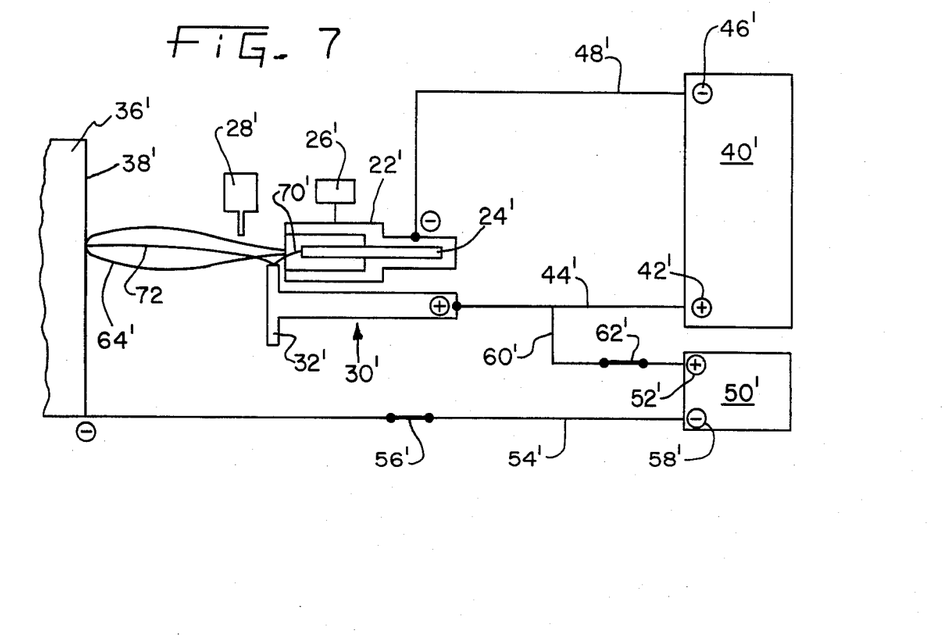
FIG. 7 is a schematic view of a specific embodiment with electrical connections along the lines of FIG. 5.

FIG. 7 illustrates a plasma generator arrangement wherein a negative charge from the independent DC power source 50' is applied at the substrate. In FIG. 7, the positive terminal of the independent DC power source 50' is connected to the anode 32'. When the plasma generator is in operation with switches 56' and 62' in the wires from the independent DC power source open, it operates like a non-transferred arc plasma generator as previously discussed. Upon switches 56' and 62' being closed, on the substrate 36' is placed at a negative potential. As can be appreciated, the anode 32' is at a positive potential. There is now a larger electrical potential between anode 32' and substrate 36' than there was before the negative charge was placed on the substrate. The plasma stream is electrically conductive. In view of this increase in electrical potential and the conductive nature of the plasma stream 64', a second electric arc 72 is formed between the surface 38' of the substrate 36' and the anode 32'. In other words, electrons migrate from the substrate to the anode. There now simultaneously exist two electric arcs. One electric arc 70' extends from cathode 24' to anode 32' and a second electric arc 72 extends form the substrate to the anode 32'.

The presence of the second electric arc 72 in the plasma stream 64' results in a greater turbulence in the interior of the plasma stream. This turbulence leads to a change in the charge density gradient of the plasma stream. A cross-section through the plasma stream at point "F" in FIG. 7 would show that the density of charged particles at the outer edge of the plasma stream 64' is greater than at the center. This is opposite to the density gradient of charged particles in a plasma stream that does not have the second electric arc. In that type of plasma stream, the density of charged particles decreases radially from the center to the outer edge.

As mentioned earlier, the electrons that form the second electric arc 72 migrate from the surface 38' of the substrate 36' to the anode 32'. This migration of electrons results in the creation of positively charged ions of the substrate material and already deposited coating material at the surface of the substrate. As can be appreciated, an ion of substrate material is more prone to chemically react with constituents of the plasma stream than a neutral compound or element which is most likely in a more stable condition. A surface which is more prone to chemically react the constituents of the plasma stream now exists as a consequence of the electron migration from the substrate. The ability to place the surface of the substrate in condition that is more prone to chemical reaction provides an additional parameter to control the reactions at the substrate surface, and hence, the chemical compositions of the coating at the substrate.

Figure 8:
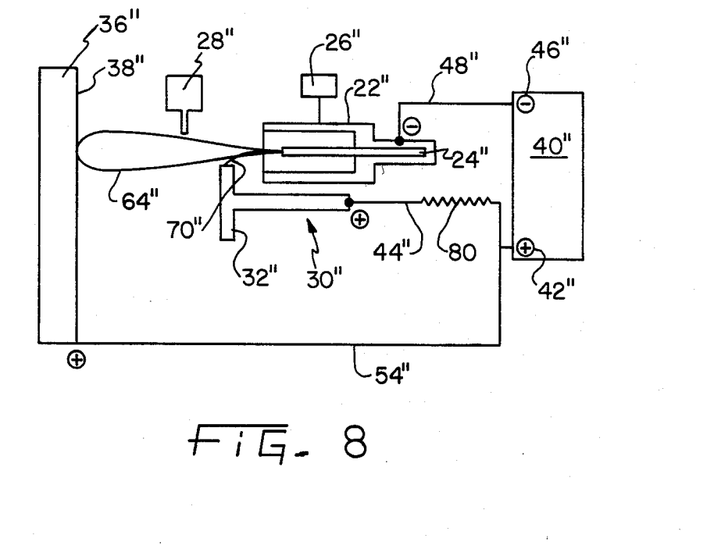
FIG. 8 is a schematic view of another specific embodiment of the invention having DC electrical power source.

Throughout this application, we have referred to a second (or independent) DC power source (50, 50', 50"). It should be understood that applicants do not intend to be limited to two such sources. Notwithstanding the practicalities associated with using more than two DC power sources, it can be appreciated that only one DC power source could be used. For example, the arrangement illustrated in FIG. 8 uses only one DC power source 40". The connections are generally like those in FIG. 1 so that a detailed description is not needed. However, it should be pointed out that a resistor 80 is connected in series between positive terminal 42" and anode 32". Wire 54" connects together positive terminal 42" and the substrate 36". The presence of resistor 80 forms a voltage divider such that the voltage of anode 32" is lower than the voltage at substrate 36". It would also be possible to utilize a varying resistance (not shown) connected in series either with anode 32" and terminal 42" and/or in series between substrate 36" and terminal 32". For example, resistor 80 could be a variable resistor. Thus, the lengthening of the plasma stream 64" could be continuously varied or varied in small discrete steps.

As previously mentioned, the semi-transferred arc liquid stabilized plasma generator can have a second DC power source that provides for variable output voltage and variable amperage. The ability to vary the positive charge at the substrate, which can be done with a DC power source such as that described above, can provide important operating controls.

For example, chemical reactions that occur between constituents of the plasma stream and the material of the substrate are generally temperature dependent. If during the course of the reaction the temperature at which the reaction takes place changes, then the reaction products may not be the same as if the reaction temperature had stayed constant. As an illustration, assume that two elements, element A and element B, may react at a particular reaction temperature ($T_1$) to form a compound AB. As long as the reaction temperature $T_1$ stays essentially constant, the reaction of A and B to form the compound AB will continue until completed. In other words, if the reaction is left undisturbed, the reaction will comprise the compound AB. However, if during the reaction process the reaction temperature is decreased below a certain point, as by shortening plasma stream 64 so that it does not contact substrate 36, then the reaction may cease. One result of this temperature change could be a reaction product that consists of the combination of the compound AB and element A+B. Although it may depend upon the specific elements involved, the formation of a reaction product having the compound AB and the elements A+B may provide advantageous characteristics absent when only compound AB is formed. This also would enable layering of compounds AB and A+B on substrate 36.

It can now be understood that the ability to vary the temperature at the surface of the substrate during coating is advantageous. A variety of reaction products can be selectively formed at the surface of the substrate. In view of earlier discussion, it should be appreciated that the temperature at the surface of the substrate can be changed by several ways.

In regard to the example mentioned above, the temperature at the surface can be decreased by shortening the plasma stream 64a so that its termination point moves away from the surface as illustrated in FIG. 6. This could be accomplished by opening switch 56 so as to completely remove the positive charge at the substrate. If this were done, the plasma generator would operate in a fashion similar to that of a non-transferred arc plasma generator. This decrease in temperature at the substrate could also be accomplished by decreasing the positive charge at the substrate to something less than the initial positive charge but greater than zero. As mentioned earlier, if this were done, the plasma stream would shorten, but not to the same degree as if all positive charge were removed form substrate. The temperature would therefore drop, but not to as low a temperature as if all the positive charge had been removed.

Although it would depend upon the specific components and goals of the application, various combinations of positive charge or lack thereof for selected periods of time and in particular sequences could be utilized by the plasma generator of the invention. The ability to vary the position or length of the plasma arc and its duration at a specific position during coating provides an ability to control the particular chemical reations that occur or do not occur at the surface of the substrate. Furthermore, the polarity of substrate 36 can be changed during coating to make the surface 38 more reactive depending on the particular result desired.

The following are proposed, but unperformed, theoretical examples which set forth how the invention may be practiced.

PROPOSED EXAMPLE NO. 1

A water-stabilized plasma generator 20 (FIG. 1) would be utilized having a rod cathode 24 made of graphite. The rotatable anode 32 would be made of iron. The plasma generator would be disposed approximately 6 to 8 inches from the surface 38 of substrate 36 that is to be coated. The substrate would be a carbon steel wherein the principal constituent is iron. This substrate is electrically conductive.

The substrate 36 would be connected to the positive terminal 52 of the independent or second direct current electrical source 50 and the negative terminal 58 of the independently controllable direct current source would be connected to the cathode 24 of the plasma generator. The main power source would be energized so as to actuate the plasma generator. Thereafter the independent direct current electrical source 50 would be energized.

The particles are fed into the plasma stream 64 in a conventional fashion. In this Proposed Example No. 1, the particles of coating material would have a composition of 92 percent nickel, 5 percent silicon and 3 percent boron and they would of a particle size from 44 to 53 microns (325 to 270 mesh). The coating would be applied so that it would be between 0.01 inches and 0.1 inches thick.

It is expected that the bond layer would contain grains of the alloys of iron, nickel and silicon and especially alloys having the following compositions: (a) 55 percent iron and 44.7 percent nickel and 3 percent carbon, and (b) 97.5 percent iron and 2 percent silicon and 0.5 percent carbon. The bond layer would further be expected to contain microelements of silicides (especially $NiSi_2$), borides (especially $SiB_4$), and oxides of nickel such as NiO. The coating layer would be expected to be principally comprised of Ni (92 percent), Si (5 percent) and B (3 percent).

PROPOSED EXAMPLE NO. 2

This Proposed Example No. 2 uses the same arrangement of the plasma generator as Proposed Example No. 1, but the stabilizing liquid is ethyl alcohol ($CH_3CH_2OH$) and the coating material comprises a combination of nickel and chromium. The particulate material that would be fed into the plasma stream would be a combination of 80 weight percent nickel and 20 weight percent chromium wherein the particle size would be between 44 to 53 microns (325 to 270 mesh). An iron substrate would be utilized.

It is expected that the bond layer would contain grains of iron, nickel and chromium alloys and microelements of carbides of chromium (especially $Cr_3C_2$). The coating layer would be expected to be principally the Ni-Cr alloy (80 percent Ni and 20 percent Cr).

PROPOSED EXAMPLE NO. 3

This Proposed Example No. 3 uses the same arrangement of the plasma generator as in Proposed Example No. 1. The stabilizing liquid would be 2-picoline ($CH_3C_5H_4N$). The coating material which would be fed into the plasma stream and consists of a particulate material comprised of 80 weight percent nickel and 17 weight percent chromium and 3 weight percent boron wherein the particle size is between 44 to 53 microns (325 to 270 mesh). The substrate would be iron.

It is expected that the bond layer that would be formed contains grains of iron-nickel chromium alloys and microelements of carbides (especially $Cr_3C_2$ and $B_4C$), and nitrides (especially $Cr_2N$). The coating layer would be expected to be principally comprised of an alloy of Ni (80 percent)—Cr (17 percent)—B (3 percent).

While there have been described above the principles of this invention in connection with specific embodiments and proposed examples, it is to be clearly understood that this description is made only by way of example and not as a limitation to the scope of the invention.

What is claimed is

1. A method of applying a coating to an electrically conductive substrate comprising:
   generating a plasma stream by forming an arc between a cathode and an anode and bringing a liquid into contact with the arc,
   directing the plasma stream toward the substrate,
   introducing a coating material into the plasma stream to melt and spray the coating material on the substrate,
   while the plasma stream is being generated and while coating material is being introduced into the plasma stream, selectively varying the length of the plasma stream in which ions and free electrons are present by selectively varying the voltage of the substrate relative to the voltage of the anode to thereby vary the application of the coating to the substrate.

2. The method of claim 1 wherein the varying step includes varying the length of the plasma stream to cause the plasma stream to terminate a preselected distance short of the surface of the substrate.

3. A method of applying a coating to an electrically conductive substrate comprising:
   generating a plasma stream by forming an arc between a cathode and an anode and injecting a liquid into the arc,
   directing the plasma stream toward the substrate,
   introducing a coating material into the plasma stream to melt the material and spray it on the substrate,
   while the plasma stream is being generated and after start-up of the plasma stream, selectively varying the distribution of charge density in the plasma stream relative to the substrate to vary the reactivity of the substrate or vary the application of the coating on the substrate by selectively varying the voltage of the substrate relative to the voltage of the anode.

4. A method of applying a coating to an electrically conductive substrate comprising:
   generating a plasma stream and projecting the plasma stream toward the substrate,
   introducing a coating material into the plasma stream to melt and spray the coating material on the substrate,
   after start-up and while applying coating material to the substrate, selectively varying the potential of the substrate over time so as to selectively control the charge density of the plasma stream and vary the application of the coating to the substrate.

5. The method of claim 4 wherein the plasma stream is generated by a plasma generator including an anode having a positive potential thereon, and the step of selectively varying includes placing a negative potential on the substrate.

6. The method of claim 4 wherein the step of selectively varying includes varying the substrate potential to cause the plasma stream to terminate a preselected distance short of the substrate.

7. The method of applying a coating material to an electrically conductive substrate comprising:
   generating a plasma stream and projecting the plasma stream toward the substrate,
   after start-up of the plasma stream, selectively adjusting the potential of the substrate to cause the plasma stream to impinge on the substrate for a selected length of time to thereby make the substrate reactive,
   then varying the potential of the substrate to cause the plasma steam to shorten and terminate short of the substrate, and
   introducing the coating material into the plasma stream to melt and spray the coating material on the substrate.

* * * * *